July 16, 1963  E. D. GLOVER  3,098,044
METHOD OF PRODUCING HYDROUS METAL OXIDE SOLS
Filed Nov. 25, 1955
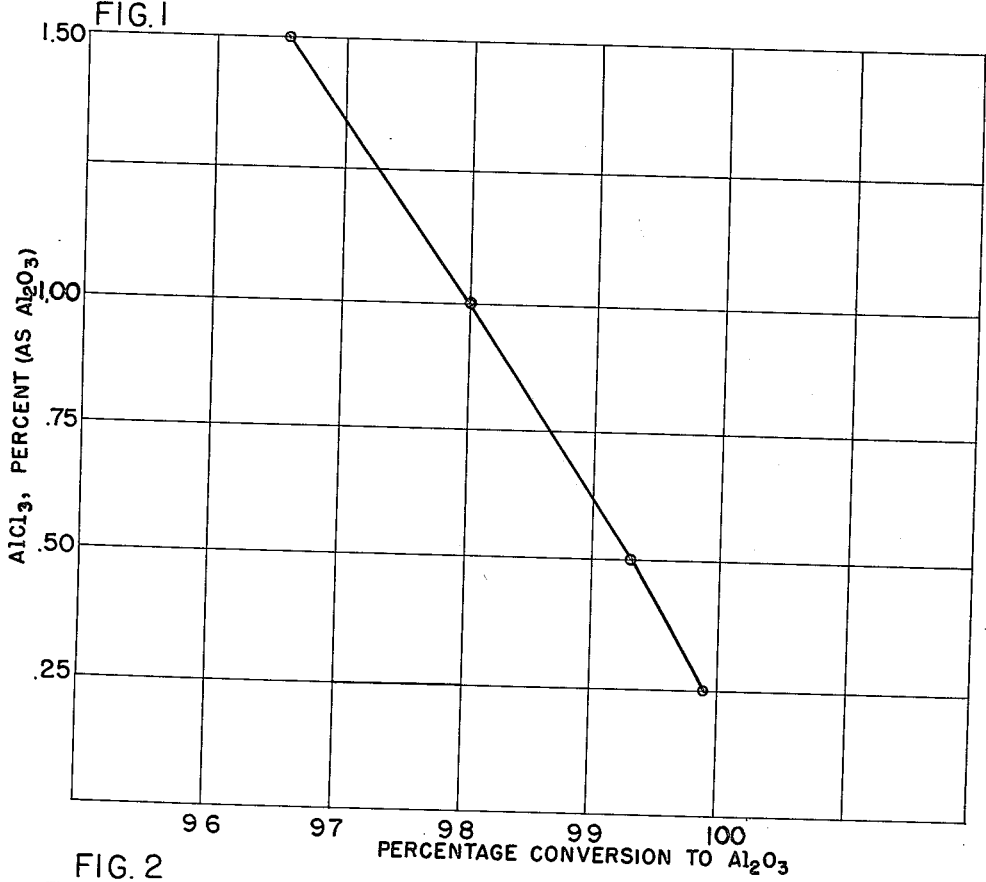
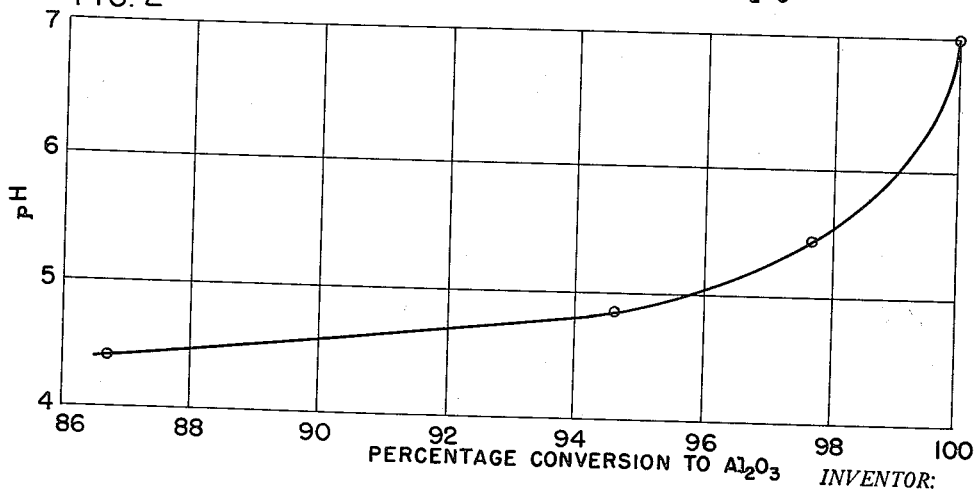
INVENTOR:
EVERETT D. GLOVER
BY Marshall Johnston,
Cook & Root
ATT'YS United States Patent Office 3,098,044
Patented July 16, 1963

3,098,044
METHOD OF PRODUCING HYDROUS METAL OXIDE SOLS
Everett D. Glover, Dallas, Tex., assignor to Nalco Chemical Company, a corporation of Delaware
Filed Nov. 25, 1955, Ser. No. 548,949
8 Claims. (Cl. 252—313)

This invention deals with a novel method for preparing hydrous metal oxide sols by an ion exchange process. It is also concerned with an improved method for the concentration of hydrous metal oxide sols and in particular the concentration of relatively dilute alumina sols whereby they are rendered more useful. In another aspect, the invention discloses a new alumina sol of unusually high concentration having exceptionally unique properties, and which heretofore has not been known.

The preparation and properties of hydrous metal oxide sols have been repeatedly described in the literature for many decades. The chemistry of these colloidal solutions has been investigated by numerous chemists. In 1926, H. Weiser published a volume entitled "The Hydrous Oxides" (McGraw-Hill Book Company, Inc.), which describes generally the many older techniques used to prepare the various hydrous metal oxide sols.

While many hydrous metal oxide sols such as those of aluminum, gallium, indium, thallium, beryllium, zinc, cadmium, mercury, tin, lead, and numerous others have been described, only several of these sols have received any commercial attention due to the rarity of the metal of which they are partially composed. The most commercially important hydrous metal oxide sol is that of aluminum. While the invention is concerned generally with all of the sols of hydrous oxides of metals that do not form stable carbonates in water, it is especially important with respect to the hydrous metal oxide sols of aluminum, gallium, iron (Fe$^{+++}$), and chromium (Cr$^{+++}$).

In Ryznar, U.S. Patent 2,438,230, a colloidal aqueous sol of a hydrous oxide is produced in dilute concentrations by passing an appropriate metal salt solution through the hydroxide form of an anion exchanger. The simplicity of this method made the production of relatively pure hydrous oxide sols economically expedient.

One of the disadvantages of preparing sols by using the ion exchange method is that the finished products are generally quite dilute and require further processing before a practical concentration may be obtained. The hydrous metal oxide sols made by prior art methods when concentrated to say over about 6% are generally so viscous that further concentration is impractical. In U.S. Patent 2,560,707 the alumina sols are said to have a maximum concentration of approximately 10% by weight.

In accordance with the invention it is therefore an object to provide a new method for producing more concentrated hydrous metal oxide sols of the type described.

Another object is to furnish a new method for making hydrous oxide sols, particularly those of aluminum, iron and chromium by an ion exchange method.

A further object is to provide a method whereby hydrous metal oxide sols of great purity can be produced.

Another object is to provide a new and useful process for concentrating hydrous metal oxide sols of the type described.

A still further object of the invention is to provide a method whereby alumina sols can be concentrated to as high as 17% alumina, as $Al_2O_3$.

A further object is to provide a method of producing a hydrous metal oxide sol of high purity and having a neutral or near neutral pH.

Other objects and advantages of the invention will be apparent by reference to the following description in conjunction with the accompanying drawing in which FIG. 1 represents a graph showing the percentage of aluminum chloride used in the preparation of a sol as a function of the degree of conversion when gelation occurs; and FIG. 2 is a graph representing the pH of an alumina sol as measured immediately on formation as a function of the percent conversion.

According to the invention new and useful sols are produced by contacting a dilute aqueous solution of a metal salt which hydrolyzes in water to give an acidic solution, the anion of said salt being monovalent and the metal cation being capable of forming insoluble hydrous oxides, with a water insoluble anion exchange resin which has as its exchangeable anion an anion of a weak volatile inorganic acid. It is preferable to remove from the produced sol any excess volatile gas contained therein.

In working with several hydrous metal oxide sols it was observed that stability is normally maintained in an acid pH range. If at any time a sol is allowed to pass into an alkaline pH range and is subsequently brought back in to a stable pH range, the resultant sol is not as stable nor as uniform in its properties as are sols which are processed under conditions which do not allow the sol at any time to pass into an alkaline pH range. Thus, sols of great purity and stability having unusual properties are produced.

While any anion exchanger may be used that is capable of being treated whereby its exchangeable positions contain the anions of weak volatile inorganic acids it is preferred to use what are now well known to the art as strongly basic anion exchangers. These exchangers or resins have recently been used in numerous applications and perhaps their most unique characteristic is their ability to "split salts" from aqueous media. By the expression "split salts" is meant that the resins are capable of exchanging various anions directly for other anions without first being converted into the hydroxide form. This salt splitting ability of the strongly basic anion resins is attributed to the quaternary ammonium groups which these resins possess and is not normally possessed by the weakly basic anion exchange resins.

Examples of strongly basic anion exchange resins which can be employed in the practice of the invention are those described in U.S. Patents 2,591,573; 2,597,440; 2,597,494; 2,614,099; 2,630,427; 2,632,000, and 2,632,001. Examples of weakly basic anion exchange resins which can be employed are those described in U.S. Patents 2,582,098; 2,597,439, and 2,597,491.

The strongly basic insoluble anion exchange resins which are preferably employed for the purpose of the invention are reaction products of a tertiary amine and a vinyl aromatic resin having halo methyl groups attached to the aromatic nuclei in the resin. Another class of anion exchange resins suitable for the practice of the invention are the reaction products of the tertiary carbocyclic or heterocyclic amines and vinyl aromatic resins having halo methyl groups attached to the aromatic nuclei in the resin. The vinyl aromatic resins employed as starting materials in making the anion resins employed in the preferred practice of the invention are normally solid benzene insoluble copolymers of a monovinyl aromatic compound and a polyvinyl aromatic compound containing from 0.5 to 40% by weight, preferably from 0.5 to 20% by weight of the polyvinyl aromatic compound chemically combined. Examples of suitable monovinyl aromatic compounds are styrene, alpha methyl styrene, chlorostyrenes, vinyl toluene, vinyl naphthalene and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene, and divinylethyl benzene. These resins are halo methylated as described, for instance, in U.S. Patent 2,614,099, preferably to introduce an average of 0.2 to 1.5 halomethyl groups per aromatic nucleus in the copolymer and then reacted with a tertiary amine to introduce a quaternary ammonium anion exchange group. Examples of suitable tertiary amines are trimethylamine, triethylamine, tributylamine, dimethylpropanolamine, dimethylamine, 1-methylamine, dioctyl ethanolamine, and homologues thereof. The preferred tertiary amines can be described as mono- and di-alkyl N-substituted alkanol and alkane diol amines.

The weakly basic resins are prepared in a similar manner except that the primary and secondary amines are reacted with the haloalkylated resin. Examples of such amines are methylaniline, dimethylamine, n-butyl amine, dibutyl amine, isobutylamine, aniline, benzidines, toluidines, xylidines, alpha and beta naphthalenediamine, benzylamine, dibenzylamine, ethylenediamine, cyclohexylamine, diethylenetriamine, triethylenetetramine, tetraethylenepentamine, propylenediamine, dipropylenetriamine, and homologues thereof. The anion exchange resins can also be prepared by halogenating the molecule of the resin and then introducing an anion exchange group as described in U.S. Patent 2,632,000.

The volatile weak inorganic acids, or more specifically the anions thereof, that are preferably used are the bicarbonate and carbonate. The sulfide, cyanide and nitrite can also be used. Of course, due to the inherent disadvantages in using the acids or salts containing the sulfide or cyanide radical, these are less desirable for most practical purposes. The water soluble alkali metal carbonates and bicarbonates are admirably suited for treating strongly basic anion exchange resins to place the resin in a form appropriate for subsequent treatment with a dilute solution of the appropriate metal halide. Excellent results have been achieved by using solutions of sodium bicarbonate. Although the water soluble alkali metal salts of these particular classes of anions are preferably used, it is apparent that other methods may be used to regenerate the resins prior to their employment in the practice of the invention. For instance, if a weak anion exchange resin is used, it can be converted to the hydroxide form and the latter then treated in an aqueous solution into which carbon dioxide gas is being bubbled. Under proper conditions of pH and chemical equilibrium, a certain amount of resin will be placed in the carbonate form and it can then be used for performing the operations of which several are subsequently described.

The sols produced by contacting an anion exchanger having in its exchangeable positions the anion of a weak volatile inorganic acid contain amounts of dissolved or dispersed gas such as carbon dioxide or hydrogen sulfide which is preferably removed from the sol to render it more stable as well as to provide a finished product having greater purity. The gas may be readily expelled by slight heating or it may be removed by any of the well known methods now available for removing dissolved or dispersed gases from liquid media. If carbon dioxide is the produced gas it has been found that when the temperature of the produced sol is elevated to about its boiling point the majority of the dissolved gas readily volatilizes into the atmosphere leaving behind a sol of extremely high purity. If the volatile gases contained in the sol are obnoxious or dangerous, such as hydrogen sulfide or cyanic acid, extreme caution should be used in removing the gas lest harm be inflicted upon the operator of the process.

In the case of alumina sols, the preferred method used produces a sol containing up to 1.5% by weight alumina, as $Al_2O_3$, depending upon the percent conversion obtained. A further limitation on the concentration of the sol is the relative amount of the solution and resin. For strongly basic anion exchange resins, approximately air dry, 500 milliliters of a 1% sol requires 200 grams of resin, roughly 200 milliliters in volume; 500 milliliters of a 2% sol would require about 400 grams of resin (approximately 400 milliliters). When there are higher concentrations of metal halide, more water is needed for washing sol from resin. The preferred limit of the concentration of the hydrous metal oxide after rinsing from the resin is between 0.5% and 1% dry weight.

With further reference to his phenomenon, attention is directed to FIG. 1, which shows the percentage of aluminum chloride used in the preparation of alumina sols as a function of the degree of conversion when gelation occurs. This table teaches that in order to convert an aluminum halide to a 99.8% alumina sol, it is necessary that relatively dilute concentrations (e.g., about .25% $AlCl_3$, as $Al_2O_3$) be used. As the percentage of aluminum chloride used in the starting solution is increased, e.g., to about 1.50%, the percentage of conversion is somewhat diminished and reaches about 96.5%. In order to maintain the quality of the sol produced within the range of about 95% to about 99.8% alumina, it is generally necessary that the concentration of the starting metal salt be kept between about .25% and 1% by weight concentration, expressed as the metal oxide.

Again in the case of an alumina sol, it was noted that the higher the percentage of alumina sol produced, the higher would become the pH until the neutral point of pH 7 was obtained. This phenomenon is illustrated in FIG. 2 which shows the pH of an alumina sol as measured immediately on formation as a function of the percent conversion. Thus, at about 87%, the pH of the sol was about 4.5, whereas at 98% conversion, the pH of the sol was approximately about 5.5, whereas at 99.8%, the pH was exactly neutral or 7.

While certain anions in the proper concentration tend to have a stabilizing effect on various hydrous metal oxide sols, an excess of such anions, or the presence of particular anions, tends to have a destabilizing or precipitating effect on the sols.

Routine experiments can be made to determine the proper amount of stabilizing ion to be used to insure a uniformly stable non-gelling product. Both the type and amount of the stabilizing ion necessary to stabilize a given sol may be readily determined by reference to numerous works in the literature covering this particular aspect of colloidal chemistry. However, it is desirable to have an amount of stabilizing ion present sufficient to keep the sol in a fluid state.

In order to more fully illustrate the novel procedures used in preparing the sol for the present invention, several sols were made up using aluminum chloride, ferric chloride and chromic chloride. In all the following examples, either the carbonate or bicarbonate form of the anion resin was used. The particular anion resin employed was the commercial material known as Nalcite SAR anion exchange resin which can be prepared as described in Bauman, U.S. Patent 2,614,099. As set forth in 43 Industrial and Engineering Chemistry 1088–1093 (May 1951), Nalcite SAR is a cross-linked styrene-divinylbenzene resin (7.5% divinylbenzene) containing quaternary amine ion exchange groups. It is a quaternary ammonium salt (R, R', R'', R''', $N^+$, $A^-$) in which one of the R's is derived from polystyrene, cross-linked with divinyl benzene and in which two of the R groups in the general quaternary salt structure are methyl groups, and one R group is hydroxy ethyl. The sols shown were prepared by two well known ion exchange practices; viz., column operation and batch mixing. In the latter the resin is removed after the sol is formed.

Example I

A bed 31¾ inches long by 1¼ inches in diameter of Nalcite SAR anion exchange resin was regenerated at room temperature (e.g., 70° F.) in 30 minutes at a flow rate of 67 milliliters per minute with 10 pounds per cubic foot of a 4% sodium bicarbonate solution and then rinsed with 2 liters of deionized water at the regeneration flow rate. The resultant anion exchange resin in the bicarbonate form was then treated with three liters of a 0.1%, as $Al_2O_3$, solution of aluminum chloride. The effluent was an alumina sol. The results of this treatment were:

| Quantity of Effluent | pH | Appearance | Percent Conversion |
|---|---|---|---|
| First 2 liters | 5.9–6.0 | Opalescent | 99.4 |
| Third liter | 6.1 | Clear | 99.4 |

*Example II*

This example shows the production of an alumina sol by a batch method, as contrasted to the continuous method of Example I. 100 grams of Nalcite SAR anion exchange resin in the bicarbonate form (prepared as in Example I) and 475 milliliters of 0.5% aluminum chloride were stirred together. After 1 hour the chloride content did not change indicating equilibrium of 97.2% conversion. After evaporation by boiling, the sol became viscous. The final analysis was: $Al_2O_3$, 3.46%; Cl, as $Al_2O_3$, 0.73%; conversion, 97.9%, and pH, 5.6–5.7.

*Example III*

150 grams of the resin used in Example II were slurried with 500 milliliters of 0.5% $AlCl_3$, as $Al_2O_3$, in water. After 38 minutes, 99.3% of the $AlCl_3$ was converted into the sol. A volume of 325 milliliters of the produced sol was evaporated on a steam bath at 160° F. to 165° F. to approximately ⅓ the original volume. The final product was a thixotropic gel with the following analysis: $Al_2O_3$, 1.15%; Cl, as $Al_2O_3$, 0.12%; conversion, 99.2%, and pH, 7.0.

*Example IV*

An alumina sol was prepared similar to that shown in Example II. Portions of the sol were passed through both an anion exchanger in the chloride form and a cation exchanger in the hydrogen form. The resulting sols were clearer in each case. Upon evaporation these sols, the portion which had been passed through the hydrogen form of a cation exchanger, gave the clearer product.

*Example V*

Two liters of a 0.5% $Al_2O_3$ sol were made with conversions of approximately 99% using the procedures shown in Example III. A one-liter portion was evaporated by boiling. A second one-liter portion was evaporated by boiling after addition of 50 milliliters of 0.972 N $HNO_3$. On evaporation the untreated sol gelled to a firm gel. Analysis showed it contained 4.2% $Al_2O_3$. Analysis of the sol to which the $HNO_3$ was added was as follows: $Al_2O_3$, 6.56%; $Cl^-$ as $Al_2O_3$ on an equivalent basis, 1.23% of solids (as $Al_2O_3$); and the resultant finished gel had an $NO_3$ concentration of 1.68% (as $Al_2O_3$ on an equivalent basis), calculated from the amount of $HNO_3$ added. The $HNO_3$ stabilized sol on aging became more viscous and subsequently set to a gel.

*Example VI*

Using a process similar to Example III, 1900 ml. of an 0.5% ferric oxide sol having a conductivity of 300 micromhos was produced from a solution of 0.5% $FeCl_3$ in water. The product could be concentrated by boiling. The resultant sol was a clear reddish black sol which upon concentrating was boiled down to ⅓ of its volume. Further concentration produced a gel.

*Example VII*

Using the procedure substantially as described in Example III but substituting chromic chloride for aluminum chloride, a hydrous oxide sol of chromium was produced. Instead of the metal chlorides, other water soluble metal salts having monovalent anions and which hydrolyze in water to produce acidic solutions can be employed as starting materials in the foregoing examples, for instance, the bromides, the nitrates, the acetates, the halo-substituted acetates, and the sulfamates of aluminum, iron, and chromium.

In the practice of the invention, while the sols can usually be concentrated only up to say about 6% by weight by merely boiling off the liquid, it was found that if the sol was boiled and the liquid level of the boiling sol maintained constant by the addition of fresh sol concentrations as high as 17% by weight sols of the hydrous metal oxide could readily be obtained.

The concentration should be conducted using sols having the highest degree of purity and the smallest possible amount of electrolyte present. If too much electrolyte is present, the concentration process tends to build up this electrolyte content and gelation or precipitation occurs. In concentrating the sols, it is therefore desirable to use sols having purities within the range of about 90% to nearly 100% by weight of the metal oxide contained.

By maintaining the boiling liquid level constant it is meant to indicate that the sol being concentrated should not be boiled down to a point whereby it is rendered too viscous or tends to gel. Experience obtained by concentrating alumina sols demonstrated that the boiling volume in the initial stages of the process may be reduced to as low as 50% of the initial volume and subsequent additions of fresh, more dilute sol may be made without hindering the process too much. It is desirable, however, to maintain the boiling volume as constant as possible by the intermittent addition of fresh sol.

The method of concentrating an alumina sol is described in the following examples.

*Example VIII*

A 0.75% alumina sol containing 99.0% of the aluminum as $Al_2O_3$ was produced in accordance with the procedures of the invention. It had a conductivity of 300 micromhos and was boiled in a two-liter flask. The level was kept between 700 and 1200 milliliters by intermittent addition of fresh sol. The analysis of the final product was: $Al_2O_3$, 17.0%; $AlCl_3$, 0.2%, as $Al_2O_3$.

*Example IX*

In two other similar experiments with 95% and 91.5%, respectively, converted sols, the resultant products were concentrated to 14% and 13%, respectively, giving rather opaque materials. The procedure used was similar to that given in Example VIII.

When the highly concentrated alumina sols were made they were viscous and often showed signs of gelation after standing for one to several weeks. The resultant soft gels were thixotropic and could be returned to a free flowing condition by agitation.

The stability of the more concentrated alumina sols of the invention can be enhanced by freezing as illustrated in the following example.

*Example X*

A 17% alumina sol, which over a period of several weeks tended to form a thixotropic gel of the type previously described in Example IX, was frozen solid in a one ounce jar and placed in the freezer unit of a household refrigerator, the temperature of which was about −23° C. The material was maintained in the freezing compartment until the entire portion of the sample was frozen solid. On thawing, the material was somewhat more opaque, much less viscous, and showed very strong birefringence of flow indicating that the particles were anisotropic.

Although the sol seemed more opaque to the eye, there was no tendency to settle on standing 48 hours. Also, the viscosity did not increase in this time interval. The thawed sol gave a somewhat denser gel on the addition of magnesium sulfate than obtained on the unfrozen material. Two months following the freezing of the sol the viscosity was measured using a pipette giving a value of 8 centipoises when compared to water. The effect of freezing was not permanent since after a week the sol formed a stiff gel which was returned approximately to its former fluid state by shaking.

In addition to their many other useful and interesting properties, the sols of the present invention can be dried to fine alumina powders as illustrated by the following examples.

*Example XI*

Four 50 ml. portions of the 0.5% alumina sol (99% converted) were evaporated by boiling in a beaker after the addition of 1, 3 and 5 ml. of 0.5% aluminum chloride. The material was subsequently dried. Redispersion of the dry material in water gave the following results:

| Ml. of 0.5% $AlCl_3$ added: | Appearance |
|---|---|
| 1 | Very cloudy. |
| 3 | Clear sol. |
| 5 | Clear sol. |

*Example XII*

This example shows the drying of the sol in ethyl alcohol. Two 100 ml. portions of a 1% by weight 99% converted alumina sol were treated by adding 10 ml. and 25 ml. of 0.0972 N nitric acid, respectively. The samples were placed on a hot plate and boiled about three-quarters of an hour, then 50 ml. of ethyl alcohol were added, the solution was boiled a few minutes, then removed from the hot plate and 20 ml. of ethyl alcohol were added. After air drying, the sample showed the following characteristics.

| Ml. of 0.0972 N $HNO_3$ added: | Appearance of dried product |
|---|---|
| 10 | Hard, clear solid; soluble in de-ionized water giving a cloudy sol. |
| 25 | Hard, clear solid; soluble in de-ionized water giving a clear sol. |

The percentage $Al_2O_3$ in this latter sample was 61.3.

The alumina sols produced in accordance with the teachings of the invention can be dried down in the presence of low molecular weight aliphatic polyols (e.g., glycerine, ethylene glycol, diethylene glycol, etc.) whereby they can be readily redispersed in water. In order to illustrate this interesting property the following examples are given using glycerine as the aliphatic polyol.

*Example XIII*

500 ml. of 0.5% alumina sol (98% conversion) were evaporated on a steam bath (160° F. to 180° F.) after the addition of approximately 15 grams of glycerine. The resulting product had the consistency of vaseline and dispersed rapidly in water forming a viscous dispersion.

*Example XIV*

A 500 ml. portion of a 0.5% alumina sol was prepared. 8 grams of glycerine were added before conversion. The sol formed had the same appearance as it did without the presence of glycerine. On peptizing and evaporation on the steam bath, the resulting product was soft and pliable and readily dispersed in water.

Several other preparations using varying proportions of glycerine to $Al_2O_3$ present in the sol were made to determine the critical amounts of glycerine needed to be able to dry down the sol so that it might be redispersed in water. The results of these experiments show that the minimum amount of glycerine needed was 2 ml. for every 1.25 grams of $Al_2O_3$ present in the sol. It was also determined that the maximum concentration of $Al_2O_3$ which could be obtained in the sols was about 32% by weight with good results being obtained with products containing 28% to 32% by weight of $Al_2O_3$ in the glycerine-alumina mixture.

In conducting the experiments which led to the development of the invention it was soon discovered that the sols produced contained small amounts of particles which seemed to cloud the sol. It was learned that the majority of these materials could be peptized back into suspension by heating the sols for a short period of time up to between 160° F. to 180° F. Any material that did not go back into the colloidal solution settled from the bottom of the vessel and could be readily removed. The cause of the impurities, which were usually in the form of porous, flocculent particles, could be corrected by thoroughly conditioning the resin with dilute acid and dilute alkali (about 1-4 normal) followed by a rinse with deionized water as well as by constant agitation of the mixture of the metal salt solution used and the resin.

A sample of a dilute alumina sol was viewed through an electron microscope and it was discovered that the particle sizes of the dilute, e.g., 1% to 3% by weight $Al_2O_3$, sols, were about 25 millimicrons or less in diameter. Another set of electron microscope pictures indicated that the particles of the sols were filamentary in nature. The concentration process causes the small individual filamentary particles to agglomerate into larger more coherent masses which produces alumina particles in the sol having a smaller surface area per unit volume than the particles in the original starting sol.

The sols obtainable according to this invention are suitable for a great variety of purposes. They may be used for waterproofing building materials constructed from hydraulic binding agents or binding agents which harden in the air, as for example, concrete, cement mortar or lime mortar, or for waterproofing insulating masses, the liquid or solid sols being incorporated with the materials to be be mixed or with the necessary water. The liquid sols may also be used, if desired, together with other substances, as for example, silica sol, lime water, ammonia and other substances, for waterproofing parts of buildings or building elements constructed of porous material, as, for example, porous bricks, stones, tiles, plates, pipes, walls, floor coverings, wall coverings, light stones, asbestos plates, cork plates or gypsum plates, or insulating masses, such as diatomite, either by coating them superficially with a film of the sols by spraying or painting, or by impregnating them with the sols. If necessary, the materials may be subsequently heated to high temperatures, as for example, from 100° C. to 400° C. or treated for example with ammonia water.

The sols are also suitable for the preparation of adherent, if desired, transparent, protective coatings free from cracks on articles of all kinds. Glass plates which have been coated for example with a film of alumina gel will withstand temperatures of 400° C. and more without the film being destroyed. Films of alumina may be applied to show window panes and spectacle glasses (especially in gas masks) to protect them from becoming coated in moist air (breath-proof). The sols may also be used for glazing ceramic bodies, as, for example, silicon articles, the bodies being subsequently fired. When employed as a varnish on wood or tapestry, the sols impart gloss and washability. The sols, if desired with an addition of other substances, are suitable for the impregnation of wood, textiles, threads, fabrics, paper and pasteboard, whether for the purpose of rendering them waterproof, protecting them from putrefaction or reducing their combustibility. They may also be used, if desired together with gelatine, as agents for forming or stabilizing emulsions in the preparation of petroleum, wax, oil or paraffin emulsions. The sols or the jelly particles obtained therefrom are also suitable for the preparation for example, of concentratable thick juice from sugar beet slices, for the precipitation of floating substances in solutions, such as fats, starch, yeast albumen and gelatinous substances and also rubber raw materials, for the enrichment of enzymes, as mordants for fabrics and leather, for use in the lacquer industries, dyeworks, and in the preparation of yeast, wine and beer and as substitutes for lubricants. The sols and jellies may also be employed for the refining, desulfurizing and deodorizing of solutions, oils and hydrocarbons. They are also suitable as initial materials for the preparation of salts of organic acids, as, for example, of acetic acid, formic acid, lactic acid, citric acid, tartaric acid, stearic acid, salicylic acid or pyrogallol.

The sols of the hydroxides of iron, chromium and alumina are eminently suitable as tanning agents, alumina sols being especially suitable for tawing. Contrasted with tawed leather obtained by tanning with alum, leather tanned with alumina sols is washable. The sols may also be employed in the preparation of colored leather.

The sols, especially the alumina sols, are excellent protective colloids in the preparation of sols or of difficultly precipitable suspensions from metals, metalloids and metal compounds, as, for example, sulfur suspensions of sulfur and latex. They may also be employed as agents for combating pests, preventing dry rot, preventing putrefaction, preserving eggs, impregnating tobacco to deprive the smoke of poison, for preventing rust, polishing, washing and cleaning or as additions to agents employed for these purposes. They may also be employed as coagulating agents, for example, for latex, as fillers for rubber and rubber-like substances, pasteboard and paper and for weighting silk. They constitute excellent adhesives and cements for glass, metals and ceramic masses; they are suitable as binding agents in the sizing of paper, in the preparation of silicon bricks, metal bricks, magnet cores, safety glass, in the briquetting of coke, mineral coal and the like, and in the preparation of fireproof tile.

The sols may also serve for the solidification of colloids and in the preparation of artificial composition and compressed masses of all kinds, as, for example, of urea-condensation products. They may also serve as masses producing the framework for the solidification of liquids, as, for example, alcohols, which are brought into commerce in tubes, by mixing the liquid or solid gel (the latter after swelling) with alcohols and coagulating, if desired, by the addition of electrolytes, as, for example, in the production of solid or pastry burning spirits or in the solidification of perfumes or scouring water, the tube in the latter case being provided with a filter so that merely the liquid and not the substance of the framework is pressed from the tube. Alcosols, alcogels, benzene sols, benzene gels and other organosols and organogels may also be prepared from the sols, the initial materials being either liquid or jellies. The pure sols or the jellies obtainable therefrom may also be charged into tubes, as, for example, alumina sol for employment for medicinal purposes, for example, as a substitute for aluminum acetate, when it is not desired to employ solid sols for the purpose. In this connection, sols which have been prepared by peptization with organic acids, as, for example, acetic acid, are especially suitable. The sols may also be worked up with fats and oils, as, for example, wool grease, to form salves.

The solid and liquid sols and jellies leave behind, by the addition of suitable electrolytes or by very sharp drying, as for example, at 400° C., or by drying for a long time at temperatures lower than the said temperature, dry residues which no longer dissolve in water, i.e., the so-called irreversible gels. These have a high adsorptive capacity for dissolved substances, gases and vapors and may be employed as catalysts or purifying masses, or as carriers therefor for the refining of oils and hydrocarbons, as, for example, benzines, for the desulfurization of gases and liquids, for the purification and clarification, as well as the desilicification and dechlorination of water, furthermore as base-exchange bodies or as carriers therefor. Compact or porous carrier substances, as, for example, glass beads, bauxite, active alumina, silica gel, pumice, clay or base-exchange substances, which have been superficially coated with a film of alumina sol, iron hydroxide sol or the like, or which have been impregnated therewith, the film, if desired, being rendered insoluble by the action of electrolytes or by sharp heating, may also be employed for the same purposes. The sols are also suitable as binding agents in shaping bleaching earths, active substances, as, for example, active carbon, gels, base-exchange substances and catalysts or as the initial materials for catalysts or desulfurating masses, as, for example, so-called red sludge, by grinding the said substances in a ball mill together with the sols and a suitable amount of water, shaping the mass, drying and activating by heating, a washing process being interposed, if desired.

The expression "weak acid" as used herein refers to an acid having a very low degree of ionization in water. For example, at room temperature 20° C.) the first ionization constant of hydrosulfurous acid ($H_2S$) is $9 \times 10^{-8}$; the second ionization constant is $7 \times 10^{-15}$; the first ionization constant of carbonic acid ($H_2CO_3$) is $3 \times 10^{-7}$; the second ionization constant is $7 \times 10^{-11}$. The ionization constant of hydrocyanic acid (HCN) is $2.1 \times 10^{-9}$. The ionization constant of nitrous acid ($HNO_2$) is $4.5 \times 10^{-4}$. [See Qualitative Analysis, by Pierce and Haenisch, 2nd edition (1944), page 427.]

In general, the anions of the anion exchange resins employed for the purpose of the invention are anions of acids having ionization constants not greater than $4.5 \times 10^{-4}$. The anion corresponding to hydrosulfurous acid is $SH^-$. The carbonate anion is $CO_3^=$. The bicarbonate anion is $HCO_3^-$. The anion of hydrocyanic acid is $CN^-$. The anion of nitrous acid is $NO_2^-$.

The term "volatile" is used in the sense that an aqueous solution of the acid when heated to say the boiling point, evolves a gas, sometimes with decomposition of the acid.

The term "halide" as used herein refers to the metal chlorides, bromides and iodides. In most cases, however, the metal chlorides are used as starting materials because they are more readily available and are also sufficiently soluble in water for the preparation of the initial dilute solutions which are brought into contact with the anion exchange resin.

The term "dilute" as used in describing the metal halide solution in water means that the concentration of the halide is sufficiently low to avoid substantial gelling of the sol in contact with the anion exchange resin.

The term "acidic metal salt having a monovalent anion" is used herein to describe a metal salt which hydrolyzes in water to give an acidic solution and has a monovalent anion. Salts having multivalent anions are not used as starting materials because such anions tend to coagulate the sols or cause growth of sol particles to a size above the colloidal range.

The invention is hereby claimed as follows:

1. A method of producing a hydrous metal oxide sol which comprises exchanging the anions of a dilute solution of an acidic metal salt having a monovalent anion and capable of forming an insoluble hydrous metal oxide for anions of a weak, volatile inorganic acid by contacting said dilute solution with a water insoluble anion exchange resin which has as its exchangeable anion an anion of a weak volatile inorganic acid, said anion being selected from the group consisting of carbonate and bicarbonate.

2. A method of producing a hydrous metal oxide sol which comprises exchanging the anions, of a 0.25–1.50 weight percent, expressed as the metal oxide, solution of an acidic metal salt having a monovalent anion and capable of forming an insoluble hydrous metal oxide for anions of a weak, volatile inorganic acid by contacting said solution with a water insoluble anion exchange resin which has as its exchangeable anion an anion of a weak volatile inorganic acid, said anion being selected from the group consisting of carbonate and bicarbonate, and subsequently removing from the produced sol the excess volatile gas contained therein.

3. A method of producing an alumina sol which comprises exchanging the anions of a 0.25–1.50 weight percent, expressed as $Al_2O_3$, solution of an aluminum halide with a strongly basic anion exchange resin which has as its exchangeable anion an anion from the group consisting of bicarbonate and carbonate for a sufficient time to exchange the halide ions of said aluminum halide with said exchangeable anion of said anion exchange resin.

4. A method of producing a ferric oxide sol which comprises exchanging the anions of a 0.25–1.5 weight percent, expressed as $Fe_2O_3$, solution of a ferric halide with a strongly basic anion exchange resin which has its exchangeable anion an anion from the group consisting of bicarbonate and carbonate for a sufficient time to exchange the halide ions of said ferric halide with the exchangeable anions of said anion exchange resin.

5. A method of producing a chromic oxide sol which comprises exchanging the anions of a 0.25–1.5 weight percent, expressed as $Cr_2O_3$, solution of a chromic halide with a strongly basic anion exchange resin which has as its exchangeable anion an anion from the group consisting of bicarbonate and carbonate for a sufficient time to exchange the halide ions of said chromic halide with the exchangeable anions of said anion exchange resin.

6. A method of producing a hydrous metal oxide sol which comprises exchanging the anions of a 0.25–1.5 weight percent, expressed as the metal oxide, solution of a metal salt which hydrolyzes in water to give an acidic solution, the anion of said salt being monovalent and the metal cation being capable of forming an insoluble hydrous metal oxide, for bicarbonate ions by contacting said solution with a strongly basic anion exchanger which is the reaction product of (1) a benzene-insoluble copolymer containing in chemically combined form from 0.5% to 40% by weight of a polyvinyl-aromatic hydrocarbon and from 99.5% to 60% of a monovinyl-aromatic compound of the class consisting of monovinyl-aromatic hydrocarbons having the vinyl radical directly attached to a carbon atom of the aromatic nucleus and nuclear halogenated derivatives thereof, which copolymer contains an average of from 0.2 to 1.2 halomethyl groups per aromatic nucleus in the copolymer, with (2) a tertiary amine selected from the group consisting of the tertiary mono- and di-alkyl N-substituted alkanol and alkanediol amines, in amount such that there is present in the reaction mixture at least one mol of the tertiary amine for each halomethyl group in the copolymer, said anion exchanger being in the bicarbonate form.

7. A process as claimed in claim 6, wherein the produced sol is subsequently heated to the boiling point thereof to expel the excess carbon dioxide contained therein.

8. A method of producing an alumina sol which comprises contacting a dilute solution not exceeding 1% by weight of aluminum chloride with a strongly basic anion exchanger which is formed from the reaction product of (1) a benzene-insoluble copolymer containing in chemically combined form from 0.5% to 40% by weight of a polyvinyl-aromatic hydrocarbon and from 99.5% to 60% of a monovinyl-aromatic compound of the class consisting of monovinyl-aromatic hydrocarbons having the vinyl radical directly attached to a carbon atom by the aromatic nucleus and nuclear halogenated derivatives thereof, which copolymer contains an average of from 0.2 to 1.2 halomethyl groups per aromatic nucleus in the copolymer, with (2) a tertiary amine selected from the group consisting of the tertiary mono- and di-alkyl N-substituted alkanol and alkanediol amines, in amount such that there is present in the reaction mixture at least one mol of the tertiary amine for each halomethyl group in the copolymer, said anion exchanger being in the bicarbonate form, and subsequently heating to the boiling point the produced sol to expel the excess carbon dioxide contained therein.

References Cited in the file of this patent

UNITED STATES PATENTS

| | | |
|---|---|---|
| 2,438,230 | Ryznar | Mar. 23, 1948 |
| 2,560,707 | Stark | July 17, 1951 |
| 2,577,484 | Rule | Dec. 4, 1951 |
| 2,614,099 | Bauman et al. | Oct. 14, 1952 |
| 2,733,205 | Dalton et al. | Jan. 31, 1956 |
| 2,765,242 | Alexander et al. | Oct. 2, 1956 |
| 2,798,049 | White et al. | July 2, 1957 |